(12) United States Patent
Bauer

(10) Patent No.: US 9,281,665 B2
(45) Date of Patent: Mar. 8, 2016

(54) DEVICE FOR MOUNTING A SWITCH OR THE LIKE ON A MOUNTING PLATE

(75) Inventor: Heinz Bauer, Munich (DE)

(73) Assignee: Schaltbau GmbH, Munich (DE)

( * ) Notice: Subject to any disclaimer, the term of this patent is extended or adjusted under 35 U.S.C. 154(b) by 903 days.

(21) Appl. No.: 13/472,146

(22) Filed: May 15, 2012

(65) Prior Publication Data

US 2012/0292471 A1 Nov. 22, 2012

(30) Foreign Application Priority Data

May 17, 2011 (DE) .......................... 10 2011 101 759

(51) Int. Cl.
*H01B 1/22* (2006.01)
*H02B 1/044* (2006.01)

(52) U.S. Cl.
CPC ...................................... *H02B 1/044* (2013.01)

(58) Field of Classification Search
CPC ......... H02B 1/044; H01B 1/22; H05K 9/0015
USPC .......................................................... 174/58
See application file for complete search history.

(56) References Cited

U.S. PATENT DOCUMENTS

| 4,220,808 | A | * | 9/1980 | Fujita | 174/490 |
| 5,191,969 | A | * | 3/1993 | Berger | 200/296 |
| 5,496,980 | A | * | 3/1996 | Villain | 200/296 |
| 5,684,670 | A | * | 11/1997 | Zimmermann et al. | 361/627 |

FOREIGN PATENT DOCUMENTS

| DE | 28 07 798 C2 | 8/1978 |
| DE | 102008057147 B3 | 4/2010 |
| FR | 1366038 A | 7/1964 |
| GB | 2 231 615 A | 11/1990 |
| GB | 2231615 A | 11/1990 |
| JP | S54104936 U | 7/1979 |

* cited by examiner

*Primary Examiner* — Dhirubhai R Patel
(74) *Attorney, Agent, or Firm* — Kilpatrick Townsend & Stockton LLP

(57) ABSTRACT

A device for mounting a switch or the like on a mounting plate having a front side, a back side as well as a mounting hole. The switch has a housing with a housing upper side and at least one fixing projection insertable into the mounting hole from the back side of the mounting plate. Moreover, both a support to support the fixing projection against the front side of the mounting plate and counter-supporting elements to support the housing upper side against the back side of the mounting plate are provided. The counter-supporting elements are springs.

12 Claims, 5 Drawing Sheets

DEVICE FOR MOUNTING A SWITCH OR THE LIKE ON A MOUNTING PLATE

CROSS-REFERENCES TO RELATED APPLICATIONS

This application claims priority to German Application No. 10 2011 101 759.7, filed May 17, 2011, the entirety of which is incorporated by reference herein.

BACKGROUND OF THE INVENTION

The invention relates to a device for mounting a switch or the like on a mounting plate having a front side, a back side as well as a mounting hole. The switch comprises a housing with a housing upper side and at least one fixing projection insertable into the mounting hole from the back side of the mounting plate. In order to lock the switch in place, both means to support the fixing projection against the front side of the mounting plate and counter-supporting elements to support the housing upper side against the back side of the mounting plate are provided.

It is known from the prior art to fix a switch to a mounting plate, for example, by inserting a fixing projection of the switch housing, which is provided with an outer thread, into the mounting hole from the back side of the mounting plate, and by screwing a nut onto the outer thread of the fixing projection which projects over the front side of the mounting plate. Typically, the housing upper side of the switch is directly adjacent to the back side of the mounting plate. Depending on the thickness of the mounting plate the fixing projection of the switch therefore projects over the front side of the mounting plate differently far. Thus, the operating members, which are usually arranged inside the fixing projection, e.g. a switch lever, are raised from the front side of the mounting plate differently far, depending on the thickness of the mounting plate.

To compensate for different thicknesses of the mounting plate adjustable counter-supporting elements are known from the prior art, by means of which the housing upper side can be supported against the back side of the mounting plate, with the gap between the housing upper side and the back side of the mounting plate being adjustable. Such a device of the aforementioned type is known, for example, from DE 10 2008 057 147 B3. For the purpose of supporting the housing upper side against the back side of the mounting plate this device comprises multiple setscrews fitted into the housing, which can be moved out of the housing upper side by rotating them, so that the distance desired between the housing upper side and the back side of the mounting plate is adjustable. The adjustment of the setscrews is relatively complicated, however, and has to be carried out with a tool. Also, the mounting of the switch is difficult, because the housing upper side is not supported against the back side of the mounting plate before the setscrews are moved out. If the fixing projection has already been inserted into the mounting hole of the mounting plate, the switch can easily slip out of position or turn slightly and, therefore, has to be held in position while the setscrews are moved out of the housing upper side. In order to bring the switch back into position after it has turned to an undesired small extent, it is necessary to move the setscrews back in again to some extent after the full assembly, which likewise is a time-consuming procedure which can only be carried with a special tool.

BRIEF SUMMARY OF THE INVENTION

Therefore, it is the object of the present invention to provide a device of the aforementioned type, which allows a compensation of mounting plates with varying thicknesses and, moreover, a simple and fast assembly without the use of tools.

The object is achieved by the features of independent claim 1. Accordingly, the object is achieved in accordance with the invention if the counter-supporting elements for supporting the housing upper side against the back side of the mounting plate are formed by springs. With a corresponding spring travel the housing upper side can be optimally supported against the back side of the mounting plate, even if the gaps between housing upper side and the back side of the mounting plate vary. An adjustment of the springs is not necessary, so that the complicated adjustment by means of a special tool is omitted.

Advantageous embodiments of the present invention are defined in the dependent claims.

In a specifically preferred embodiment of the present invention the springs are leaf springs, which are connected to the housing and resiliently press against the back side of the mounting plate, so that at least an upper edge of the leaf spring or a section of an upper side of the leaf spring directly adjacent to the upper edge is in contact with the back side of the mounting plate. Thus, a very cost-effective and easy-to-produce type of support is obtained.

Preferably, each leaf spring runs from an edge of the housing upper side obliquely in an upward direction towards the back side of the mounting plate, preferably from the edge of the housing upper side in an inward direction towards a fixing projection that starts in the center of the housing upper side. Firstly, a stable support for the switch is thus obtained. Secondly, no additional installation space around the switch housing is required underneath the mounting plate.

In another specifically preferred embodiment of the present invention the leaf springs are hinged to the housing to be foldable against the back side of the mounting plate, and are lockable in the unfolded position. After the support of the fixing projection against the front side of the mounting plate has been realized, the spring force can thus either be produced only then, or it can be intensified. By unfolding the leaf springs they are quasi tensioned, and the supporting counter-force produced by the tension can be maintained by the locking of the leaf springs in the unfolded position.

In another specifically preferred embodiment of the present invention the leaf springs are each permanently connected to a clamp comprising a central part and two side parts projecting on opposite sides of the central part, wherein the clamp is rotatably hinged to the housing about a rotation axis in the region of the housing upper side, and wherein the clamp embraces one side of the housing in the unfolded position of the leaf spring, wherein a first detent member of each side part engages in this position a corresponding second detent member of the housing. This embodiment constitutes a very simple possibility of locking the leaf springs in the unfolded position. The clamps can be folded down manually and without a special tool about the rotation axis in the region of the housing upper side, so that the central part of the clamp rests against the embraced side of the housing and the detent members of the two side parts engage the detent members of the housing. At the same time, the leaf spring connected to the clamp is folded upwardly towards the back side of the mounting plate and tensioned against this back side, respectively.

Preferably, the first detent member is a cut-out in the respective side part, and the second detent member is a projection of the housing fitting into the cut-out. This allows a simple and cost-effective production. The cut-out in the respective side part can be easily punched out of the side part. It is specifically preferred that the projection of the housing is a button which can be moved into and out of the housing by a screwdriver. Thus, the engaged position of the clamp, which corresponds to the unfolded position of the leaf spring, can be disengaged easily by screwing the button, which can be moved in and out, into the housing by a screwdriver.

Moreover, it is specifically preferred that each side part comprises a third detent member which is engageable with a corresponding fourth detent member of the housing, wherein the rotatable articulation of the clamp is achieved by rotatably mounting the third detent member in the fourth detent member. Thus, the clamp can so to speak be clicked into two detent members provided on opposite sides of the housing in the region of the housing upper side and is thus already rotatably mounted on the housing about an axis in the region of the housing upper side. This means that the clamp can be mounted on the housing very easily.

It is specifically preferred that the third detent member is a round cut-out in the respective side part of the clamp, wherein the fourth detent member is a round projection of the housing. By this, too, a cost-effective production of the clamp is achieved, by simply punching the round cut-out, which constitutes the third detent member of the respective side part, out of the side part of the clamp.

It is specifically preferred that the fourth detent member is the head of a housing screw. Thus, the housing screws, which are provided on the housing anyway, may be used as detent members, so that a cost-effective production of the device is achieved. Additional detent members for rotatably mounting the clamp need not be provided on the housing.

In another preferred embodiment of the present invention the leaf spring and the clamp are punched out of a spring steel sheet in one piece. The clamp and leaf spring permanently connected to the clamp can thus be produced in a cost-effective manner and extremely fast.

In another preferred embodiment the leaf spring has a central recess on the upper edge. This ensures that the corners of the upper edge of the leaf spring rest against the back side of the mounting plate at any rate, so as to ensure a parallel alignment of the switch housing relative to the mounting plate.

To ensure an improved support of the upper edge of the leaf spring on the back side of the mounting plate, thereby preventing the switch from turning in an undesired way, the upper edge of the leaf spring, or a section of the upper side of the leaf spring directly adjacent to the upper edge, may, in another embodiment of the present invention, be rubberized. Preferably, the whole upper side of the leaf spring pointing to the mounting plate is rubberized. Alternatively, the corners of the upper edge may be bent up towards the back side of the mounting plate. The bent up corners thus each form a mandrel, which is pressed against the back side of the mounting plate, thereby increasing the static friction between the leaf spring and the back side of the mounting plate.

In another specifically preferred embodiment of the present invention exactly two leaf springs are provided on opposite sides of the housing. Thus, a simple, parallel alignment of the switch housing relative to the back side of the mounting plate is achieved.

BRIEF DESCRIPTION OF THE DRAWINGS

Embodiments of the present invention will be explained in more detail below by means of drawings.

In the drawings.

DETAILED DESCRIPTION OF THE INVENTION

In the description given below like components will be designated with like reference numbers.

Figure 1:
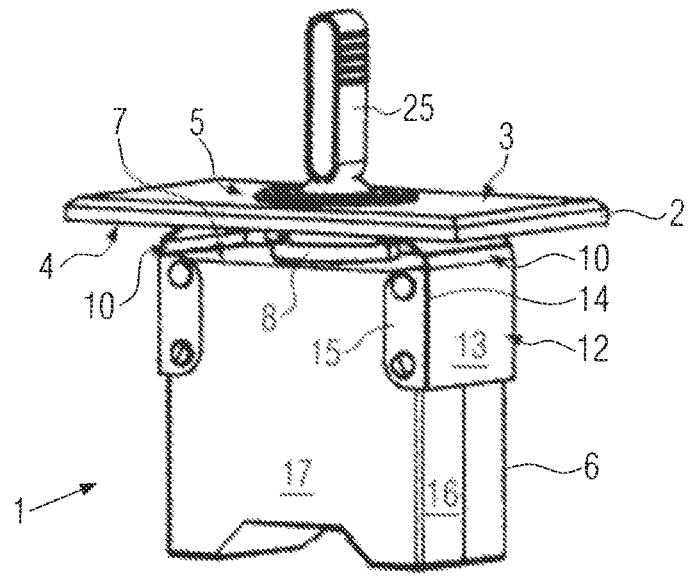
FIG. 1: shows a diagonal view of a switch mounted on a mounting plate in accordance with a first embodiment of the present invention.
Figure 6:
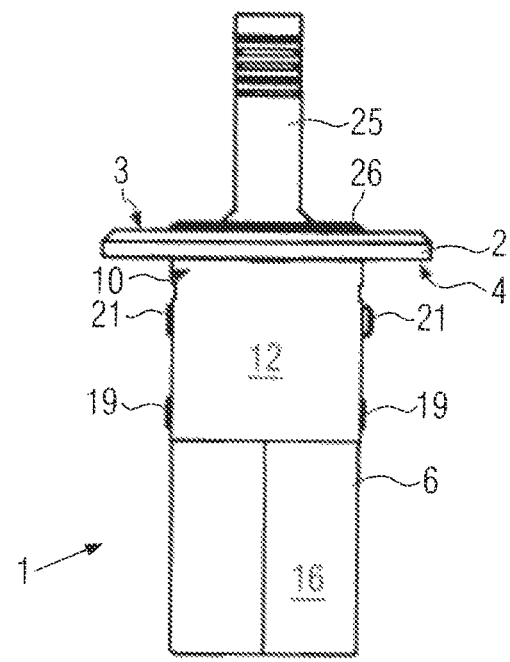
Figure 7:
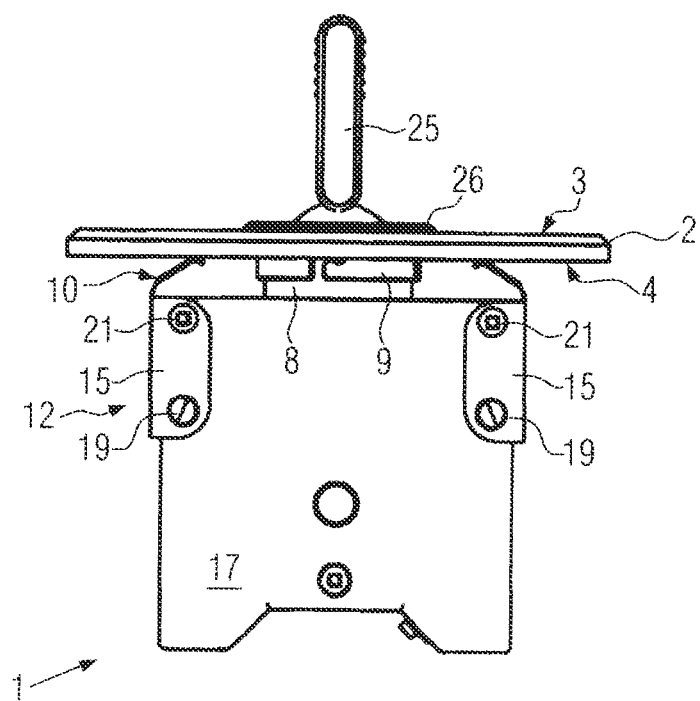

FIG. 1 shows a switch 1, which is mounted on a mounting plate 2 by means of a device according to a first embodiment of the present invention. FIGS. 1, 2, 6 and 7 each show the switch in different views. The switch in FIGS. 1, 6 and 7 is shown in the fully mounted condition.

Figure 2:
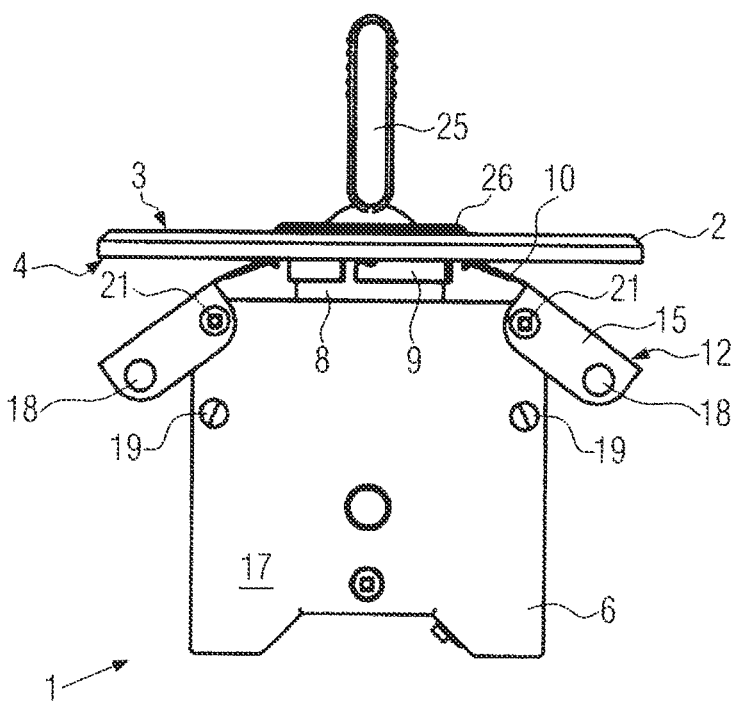
FIG. 2: shows a front view of the switch of FIG. 1 in an unlocked condition of the leaf springs used for support against the back side of the mounting plate.

The switch 1 comprises a housing 6 with two opposite narrow sides 16 and two opposite broad sides 17. On the housing upper side 7 a fixing projection 8 is formed, which is inserted into a mounting hole 5 of a mounting plate 2 from below, that is, from the back side 4 of the mounting plate 2. A fastening ring 9, which is shown in FIG. 2, is placed in a bayonet lock type on the fixing projection 8 from above, that is, from the front side 3 of the mounting plate 2. The fastening ring 9 includes an ornamental ring 26 on the upper end, which supports the fixing projection 8 and thus the entire housing 6 against the front side 3 of the mounting plate 2. The ornamental ring 26 also ensures an aesthetical appearance on the front side of the mounting plate. Inside the ornamental ring 26 an operating lever 25 of the switch is arranged, which is mounted in the fixing projection 8.

A certain gap is present between the housing upper side 7 of the switch housing 6 and the back side 4 of the mounting plate 2 so as to allow the switch 1 to be mounted also on thicker mounting plates. Due to the gap between the housing upper side 7 and the mounting plate the housing upper side has to be supported against the back side 4 of the mounting plate. According to the invention two leaf springs 10 serve this purpose, which are illustrated in more detail in FIGS. 3 to 5. Each leaf spring 10 is formed integrally with a fixing clamp 12. Each clamp 12 is comprised of a central part 13, joined at the opposite sides 14 thereof by a side part 15, which projects from the central part 13 at about 90°. In the fully mounted condition, each of the two fixing clamps 12 encloses an upper region of one of the two narrow sides 16 of the housing 6. In the fully mounted condition, the central part 13, illustrated in FIGS. 1, 6 and 7, is oriented parallel to the corresponding narrow side 16 of the housing, with both side parts 15 each being adjacent to one broad side 17 of the housing.

Figure 3:
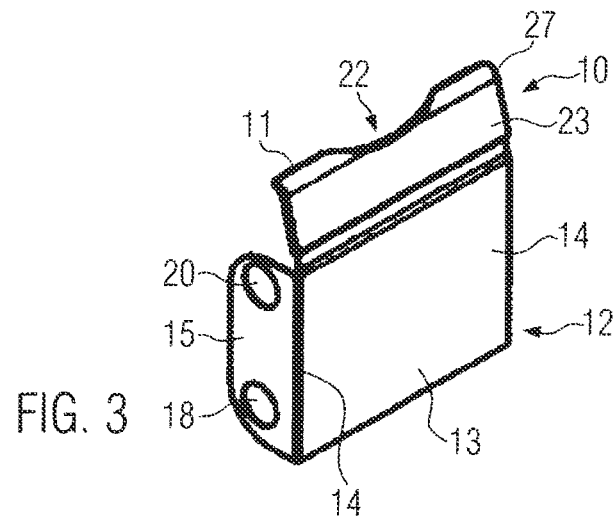
FIG. 3: shows a diagonal view of a leaf spring with a fixing clamp according to FIGS. 1 and 2, FIG. 4: shows a lateral view of the leaf spring of FIG. 3, FIG. 5: shows another diagonal view of the leaf spring of FIGS. 3 and 4, FIG. 6: shows a lateral view of the switch of FIG. 1, FIG. 7: shows a front view of the switch of FIG. 1 with locked leaf springs.
Figure 4:
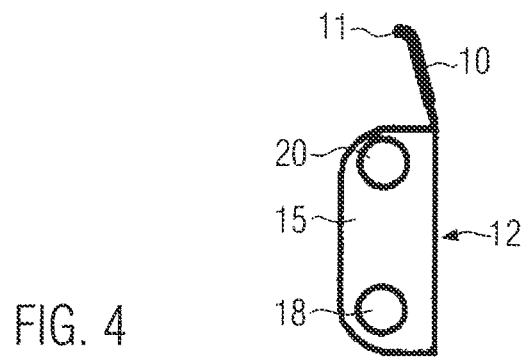
Figure 5:
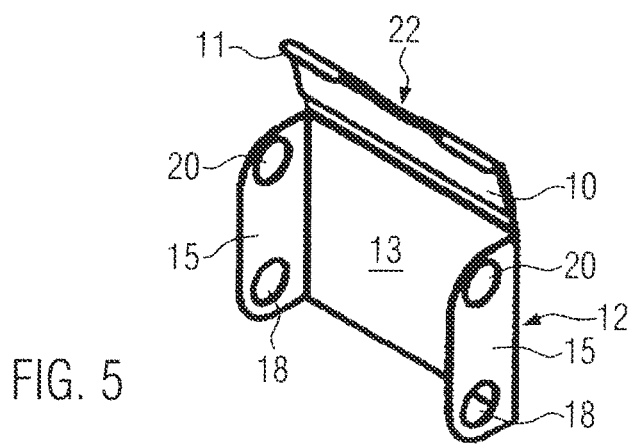

The leaf spring 10 shown in FIGS. 3 to 5 has an upper edge 11, with a central recess 22 being provided in the leaf spring on the upper edge 11. Moreover, an upper section of the leaf spring, adjacent to the upper edge 11, is slightly bent down along a fold 27. The whole upper side 23 of the leaf spring 10 is rubberized. It can be seen in FIG. 7 that, in the fully mounted condition, the leaf spring 10 is folded against the back side 4 of the mounting plate and tensioned against the back side, so that a section of the upper side 23 adjacent to the upper edge 11 rests against the back side 4 of the mounting plate. The rubber coating ensures that spring tensioned against the back side 4 of the mounting plate 2 cannot slip out of position. The central recess 22 of the leaf spring, which is shown in FIGS. 3 and 5, ensures that the leaf spring rests against the mounting plate 2 with an outer section of the upper side 23. This ensures a parallel alignment of the switch 1 with the mounting plate 2.

It can also be seen in FIGS. 3 to 5 that each side part 15 of the fixing clamp 12 has two punched out circular cut-outs. With the two upper cut-outs 20 the fixing clamp 12 can be clicked into two detent members 21 projecting from the two broad sides 17 of the housing 6, which is best illustrated in FIG. 6. The two detent members 21 are formed by one or two housing screws, respectively, which hold two halves of the housing 6 together in the region of the housing upper side. The circular cut-outs 20 allow the two fixing clamps 12 to rotate about a rotation axis, which is defined by the two detent members 21 on the housing side. As each of the leaf springs and the associated fixing clamps are punched out of spring steel sheet in one piece, a downward rotation of the fixing clamps 12 shown in FIG. 2 causes the leaf springs 10 connected to the fixing clamps 12 to be folded against the back side 4 of the mounting plate and, in further consequence, tensioned against the back side 4. The maximally possible spring tension is reached if the two fixing clamps, as shown in FIGS. 1, 6 and 7, are completely folded down against a narrow side 16 of the housing 6. In this position the fixing clamps 12 are locked by engaging another circular cut-out of the two side parts 15, that is, the lower cut-out 18 shown in FIGS. 3 to 5, with a corresponding detent member 19 of the housing 6. As is shown in FIG. 6, the detent members 19 likewise project from the two broad sides 17 of the housing 6 and are each formed by a round head, which can be moved into and out of the housing by a screwdriver. All detent members 19 and 21 of the housing have a small chamfer, which renders the clicking in or the engagement, respectively, of the fixing clamps 12 more easily.

For mounting the switch 1, the fixing projection 8 is initially inserted into the mounting hole 5 of the mounting plate 2, as was already described above. Next, the fastening ring 9 or another adequate fastening means is locked on the fixing projection 8 so as to support the fixing projection against the front side 2 of the mounting plate. Until this point in time the two leaf springs 10 are not tensioned against the back side 4 of the mounting plate 2. Accordingly, until this point in time the fixing clamps 12 project from the housing 6 of the switch in an inclined way, as is shown in FIG. 2. Then, the switch 1 is fully locked on the mounting plate 2 by folding down the two fixing clamps 12, until the circular cut-outs 18 each engage with a detent member 19 of the switch housing 6. By this, the leaf springs 10 are tensioned against the back side 4 of the mounting plate, so as to achieve an independent alignment of the housing upper side 7 parallel to the mounting plate 2. Thus, the switch 1 can be aligned and mounted on the mounting plate in a simple manner without using a special tool. In order to release the pretension of the leaf springs 10 it is possible to move the detent members 19, which are designed as buttons that can be moved in and out, into the housing 6 of the switch by means of a conventional screwdriver. By this, the locking of the two fixing clamps 12 on the detent members 19 is released. Simultaneously, the tension of the leaf springs 10 is released.

Figure 8:
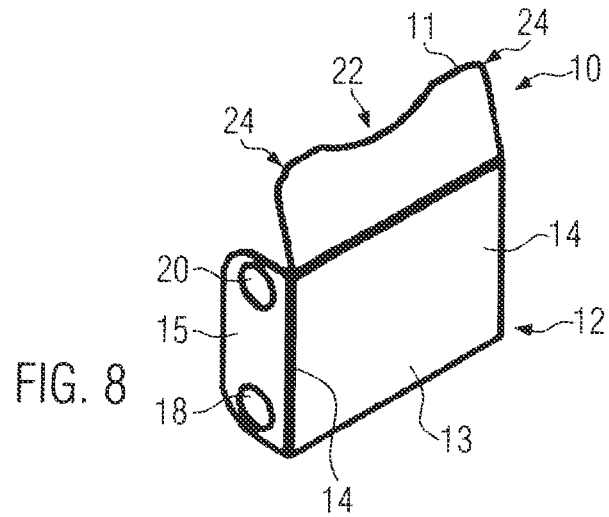
FIG. 8: shows a diagonal view of an alternative leaf spring according to a second embodiment of the present invention.
Figure 9:
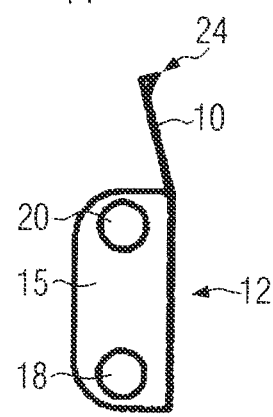
FIG. 9: shows a lateral view of the leaf spring of FIG. 8, FIG. 10: shows another diagonal view of the leaf spring of FIGS. 8 and 9, and FIG. 11: shows a front view of a switch according to the second embodiment.
Figure 10:
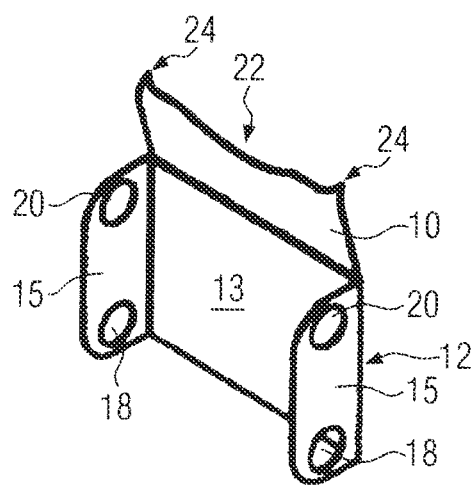
Figure 11:
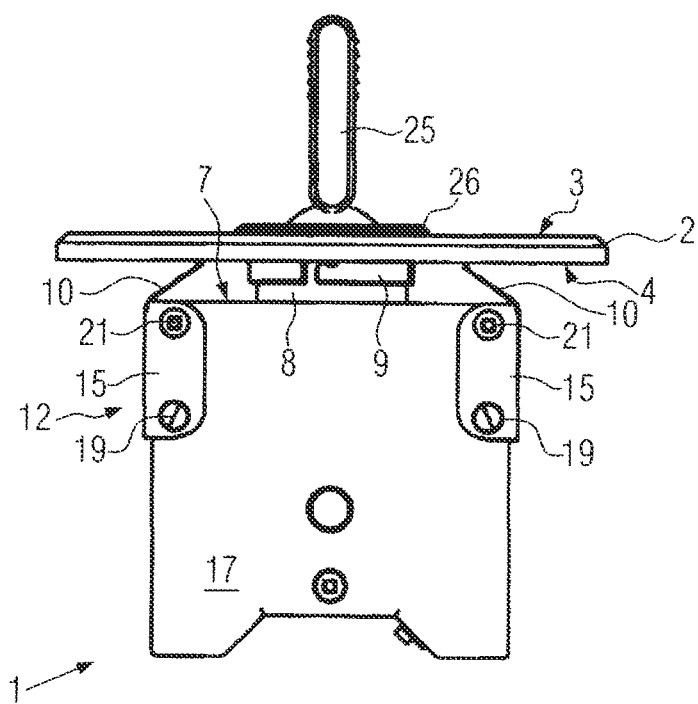

FIGS. 8 to 10 illustrate an alternative embodiment of the two leaf springs 10. In this embodiment the leaf springs are not rubberized, but the outer corners 24 of the upper edge 11 are bent up, so that these bent up corners 24 are pointing to the back side 4 of the mounting plate 2 in the fully mounted condition, as shown in FIG. 11. The bent up corners 24 increase the static friction between the upper edge 11 of the leaf springs 10 and the underside 4 of the mounting plate 2. This embodiment is particularly suited if at least the underside the mounting plate is made of a softer material than the leaf springs 10, so that the bent up corners 24 are easily pressed into the back side 4 of the mounting plate 2. Thus, the switch can be prevented from turning in an undesired way.

It is explicitly pointed out that the invention is not only suited for mounting a switch, but also for the mounting of similar electronic components.

The invention claimed is:

1. A device for mounting a switch on a mounting plate having a front side, a back side as well as a mounting hole, wherein the switch comprises a housing with a housing upper side and at least one fixing projection insertable into the mounting hole from the back side of the mounting plate, wherein furthermore means to support the fixing projection against the front side of the mounting plate are provided, and wherein the device comprises counter-supporting elements to support the housing upper side against the back side of the mounting plate, wherein the counter-supporting elements are formed by springs,
   wherein the springs are leaf springs, which are connected to the housing and resiliently press against the back side of the mounting plate, so that at least an upper edge of each of the leaf springs or at least a section of an upper side of each of the leaf springs directly adjacent to the upper edge is in contact with the back side of the mounting plate;
   wherein the leaf springs are hinged to the housing to be foldable against the back side of the mounting plate, and are lockable in the unfolded position.

2. The device according to claim 1, wherein the leaf springs are each permanently connected to a clamp, the clamp comprising a central part and two side parts projecting on opposite sides of the central part, wherein the clamp is furthermore rotatably hinged to the housing about a rotation axis in the region of the housing upper side, and wherein the clamp embraces one side of the housing in the unfolded position of the leaf spring, wherein a first detent member of each side part engages in this position a corresponding second detent member of the housing.

3. The device according to claim 2 wherein the first detent member is a cut-out in the respective side part, and the second detent member is a projection of the housing fitting into the cut-out.

4. The device according to claim 3, wherein the projection is a button which can be moved into and out of the housing by a screwdriver.

5. The device according to claim 2, wherein each side part comprises a third detent member which is engageable with a corresponding fourth detent member of the housing, wherein the rotatable articulation of the clamp is achieved by rotatably mounting the third detent member in the fourth detent member.

6. The device according to claim 5, wherein the third detent member is a round cut-out in the respective side part, and the fourth detent member is a round projection of the housing.

7. The device according to claim 6, wherein the fourth detent member is the head of a housing screw.

8. The device according to claim 2, wherein the leaf spring and the clamp are punched out of a spring steel sheet in one piece.

9. The device according to claim 1, wherein each of the leaf springs has a central recess on the upper edge.

10. The device according to claim 1, wherein at least the upper edge of each of the leaf springs, or at least a section of the upper side of each of the leaf springs directly adjacent to the upper edge is rubberized.

11. The device according to claim 1, wherein the outer corners of the upper edge are bent up towards the back side of the mounting plate.

12. The device according to claim 1, wherein the leaf springs are exactly two leaf springs, provided on opposite sides of the housing.

* * * * *